United States Patent
Scherer et al.

(10) Patent No.: US 8,262,018 B2
(45) Date of Patent: Sep. 11, 2012

(54) DRAG-OPTIMISED RAM-AIR DUCT AND PROCESS FOR CONTROLLING A MASS FLOW OF AMBIENT AIR OR COOLING AIR THROUGH A RAM-AIR DUCT

(75) Inventors: Thomas Scherer, Hamburg (DE); Alexander Solntsev, Hamburg (DE); Ruediger Schmidt, Fredenbeck (DE)

(73) Assignee: Airbus Operations GmbH, Hamburg (DE)

( * ) Notice: Subject to any disclaimer, the term of this patent is extended or adjusted under 35 U.S.C. 154(b) by 258 days.

(21) Appl. No.: 12/753,268

(22) Filed: Apr. 2, 2010

(65) Prior Publication Data
US 2010/0258675 A1    Oct. 14, 2010

Related U.S. Application Data

(60) Provisional application No. 61/167,930, filed on Apr. 9, 2009.

(30) Foreign Application Priority Data

Apr. 9, 2009 (DE) .................. 10 2009 017 040

(51) Int. Cl.
*B64D 33/02* (2006.01)
(52) U.S. Cl. ..................................... 244/53 B; 137/15.2

(58) Field of Classification Search .............. 244/53 B, 244/129.1; 137/15.1, 15.2
See application file for complete search history.

(56) References Cited

U.S. PATENT DOCUMENTS
2007/0145186 A1* 6/2007 Schmidt et al. ........... 244/117 R

FOREIGN PATENT DOCUMENTS
WO    WO2009064288    5/2009

* cited by examiner

*Primary Examiner* — Timothy D Collins
*Assistant Examiner* — Nicholas McFall
(74) *Attorney, Agent, or Firm* — Wood, Herron & Evans, LLP

(57) ABSTRACT

A ram-air duct includes a ram-air inlet duct and a ram-air outlet duct arranged downstream of the ram-air inlet duct and in fluid communication with the ram-air inlet duct. At an inlet of the ram-air inlet duct, a first movable element is arranged and adapted to set an inlet parameter of the inlet. At an outlet of the ram-air outlet duct, a second movable element is arranged and adapted to set an outlet parameter of the outlet. The outlet parameter and the inlet parameter are linked together by a function, so that an outlet parameter corresponding to a value of the function is assigned to each inlet parameter. A controller implements the control function by actuating movements of the first and second movable elements.

18 Claims, 4 Drawing Sheets

DRAG-OPTIMISED RAM-AIR DUCT AND PROCESS FOR CONTROLLING A MASS FLOW OF AMBIENT AIR OR COOLING AIR THROUGH A RAM-AIR DUCT

CROSS-REFERENCE TO RELATED APPLICATIONS

This application claims priority to U.S. Provisional Patent Application No. 61/167,930 and German Application No. 10 2009 017 040.5, both filed on Apr. 9, 2009.

TECHNICAL FIELD

The present invention relates to a ram-air duct for supplying ambient air in an aircraft, and to a process for controlling a mass flow of ambient air or cooling air through a ram-air duct.

BACKGROUND

Ram-air ducts with an air inlet and with a ram-air inlet duct extending downstream of the air inlet, with a ram-air active portion extending downstream of the inlet duct and also with a ram-air outlet duct extending downstream of the ram-air active portion, with an air outlet at the downstream end of said ram-air outlet duct, are employed in modern aircraft for the purpose of supplying various systems located on board the aircraft, such as an air-conditioning system for example, with ambient air. In the ram-air active portion there may be arranged, for example, heat-exchangers of an air-conditioning plant of the aircraft, which are perfused by supplied cold ambient air. During flight, ambient air flows through the air inlet into the ram-air inlet duct and into the ram-air active portion, whereas mechanical devices, such as, for example, injectors or fans arranged in the ram-air duct for the purpose of generating a flow of ambient air through the ram-air duct, are utilized when the aircraft is located on the ground.

In order to enable an adaptation of the flow of ambient air supplied through the ram-air duct to the differing requirements of the systems supplied with the ambient air in a manner depending on whether the aircraft is located in the air or on the ground and depending on the demand for flow of ambient air, in a region of the air inlet and also in a region of the air outlet of the ram-air duct a movable element, such as a flap for instance, is ordinarily provided, which permits an enlargement or a diminution or even a total closing of the flow cross-section of the air inlet or of the air outlet. A respective movable element may be, for example, an adjustable inlet-duct flap or outlet-duct flap which, depending on its position, enables a flow cross-section of the air inlet or air outlet that is desired in the given case.

In present-day modern passenger aircraft most ram-air ducts exhibit a similar structure or similar components. FIG. 1 shows a ram-air duct which serves to supply an air-conditioning plant of an aircraft with ambient air. The ram-air inlet duct is provided with a NACA inlet (NACA: National Advisory Committee for Aeronautics) and includes a first and a second flap, which can be adjusted by a common actuator.

If in flight the first flap and the second flap are moved out of their position closing the ram-air inlet duct (represented by continuous lines in FIG. 1) into an open position (represented by broken lines in FIG. 1) by actuation of the actuator, ambient air flows through the air inlet into the ram-air inlet duct. By reason of the retardation of the flow in a diffuser region of the ram-air inlet duct arranged downstream of the air inlet, some of the dynamic pressure of the flow is converted into static pressure. As a result, in the diffuser region and also at the input of heat-exchangers arranged in the ram-air active portion of the ram-air duct a static overpressure relative to the ambient pressure arises. The movable ram-air inlet-duct flaps control the flow of the cooling air through the ram-air inlet duct to the heat-exchangers arranged in the ram-air active portion.

A conventional ram-air outlet duct is ordinarily equipped with an outlet-duct flap as shown in FIGS. 1 and 2. In flying operation of the aircraft, an outlet-duct flap which has been opened up, as shown in FIG. 2, generates, by reason of being flowed around by the air flowing along the outer skin of the aircraft, an overpressure relative to the ambient pressure on an inside of the flap—i.e. at an outlet of the ram-air outlet duct—which also has an effect at the output of the heat-exchangers arranged in the ram-air active portion. The differential pressure between the pressure at the input and the pressure at the output of the heat-exchangers influences the mass flow of cooling air through the heat-exchangers in the ram-air active portion. Heated cooling air leaves the ram-air duct through the ram-air outlet duct. At the bottom, a fan aspirates cooling air through the ram-air inlet duct and the heat-exchangers and emits the heated cooling air through the ram-air outlet duct.

The mass flow of ambient air through the ram-air duct can consequently be controlled by an appropriate positioning of the ram-air inlet-duct flap(s) and/or of the ram-air outlet-duct flap. For example, the mass flow of ambient air through the ram-air duct can be increased by opening the ram-air inlet-duct flap(s) and/or the ram-air outlet-duct flap if a control temperature, for example a temperature of a component of the air-conditioning plant of the aircraft registered by means of a suitable sensor, exceeds a predetermined threshold value. In similar manner, the mass flow of ambient air through the ram-air duct can be diminished by closing the ram-air inlet-duct flap(s) and/or by closing the ram-air outlet-duct flap if the control temperature falls below a predetermined threshold value. In conventional control processes the ram-air-duct flaps at the ram-air inlet and at the ram-air outlet are opened up and closed up synchronously with one another, and a linear dependence between an outlet parameter and an inlet parameter is conformed to.

The term 'inlet parameter' is understood here to mean a parameter or a value that characterises an inlet cross-section at the inlet of the ram-air duct, such as, for instance, the position of the movable element at the inlet of the ram-air inlet duct. In this connection, the position of the movable element may be specified as an opening angle of the movable element or as a spacing of a region, in particular an end region, of the movable element from a fixed region of the outer skin of the aircraft surrounding the inlet.

The term 'outlet parameter' is understood here to mean a parameter or a value that characterises an outlet cross-section at the outlet of the ram-air outlet duct, such as, for instance, the position of the movable element at the outlet of the ram-air outlet duct. In this connection, the position of the movable element may be specified as an opening angle of the movable element or as a spacing of a region, in particular an end region, of the movable element from a fixed region of the outer skin of the aircraft surrounding the outlet.

Since, by reason of the fact that in the open state the flap projects from the outer skin of the aircraft, the opening of the ram-air outlet-duct flap increases the aerodynamic drag and hence the fuel consumption of the aircraft, in connection with the control of the mass flow of ambient air through the ram-air duct a position of the flap that is as closed as possible should always be striven for. Recent aerodynamic investigations have shown, in addition, that an open ram-air outlet-duct flap generates a higher additional aerodynamic drag than an open ram-air inlet-duct flap or open ram-air inlet-duct flaps. In order to guarantee a sufficient mass flow of ambient air through the ram-air duct, in normal operation of conventionally designed ram-air ducts, and given compliance with a linear relationship between the outlet parameter and the inlet parameter, as shown in FIG. 3, it is, however, unavoidable as a rule to open the ram-air outlet-duct flap relatively wide—i.e. to position it inclined at an angle of >10° relative to a portion of the outer skin of the aircraft surrounding the ram-air outlet. Furthermore, the ram-air outlet-duct flap projecting into the flow of ambient air flowing around the outer skin of the aircraft in flying operation of the aircraft, as well as separations of the flow of air emerging from the ram-air outlet, cause turbulences in the flow of ambient air flowing around the outer skin of the aircraft in flying operation of the aircraft, which further increase the additional aerodynamic drag of the aircraft caused by the ram-air duct.

The object of the present invention consists in specifying a ram-air duct for supplying ambient air in an aircraft, as well as a process for controlling a mass flow of ambient air or cooling air through a ram-air duct, which enable a diminution of the additional aerodynamic drag caused by the ram-air duct in flying operation of the aircraft.

SUMMARY OF THE INVENTION

This object is achieved by a ram-air duct with the features described below and also by a process for controlling a mass flow of ambient air or cooling air through a ram-air duct, with the features described below.

In accordance with the invention, the idea underlying the solution to the task is to adapt the conventional, substantially linear dependence between the inlet parameter, for example the position of the ram-air inlet-duct flaps, and the outlet parameter, for example the position of the ram-air outlet-duct flap, in the control of the mass flow of ambient air in such a way that the ram-air outlet is opened only minimally over a control range that is as large or wide as possible and an increase in the amount of cooling air is realised on demand by an appropriate control of the ram-air inlet-duct flaps.

A ram-air duct according to the invention includes a ram-air inlet duct and a ram-air outlet duct which is arranged downstream of the ram-air inlet duct and in fluid communication with the ram-air inlet duct. The ram-air duct further includes a movable element which is arranged at an inlet of the ram-air inlet duct and adapted to set an inlet parameter E of the inlet, wherein a smaller inlet parameter corresponds to a smaller flow cross-section of the inlet and wherein a larger inlet parameter corresponds to a larger flow cross-section of the inlet. The inlet parameter is adjustable within a control range from a minimal inlet parameter up to a maximal inlet parameter. The ram-air duct further includes a movable element which is arranged at an outlet of the ram-air outlet duct and adapted to set an outlet parameter A of the outlet, wherein a smaller outlet parameter corresponds to a smaller flow cross-section of the outlet and wherein a larger outlet parameter corresponds to a larger flow cross-section of the outlet. The outlet parameter is adjustable within a control range from a minimal outlet parameter up to a maximal outlet parameter.

The outlet parameter and the inlet parameter are linked together by a function $f$, so that an outlet parameter corresponding to a value $f(E)$ of the function $f$ is assigned to each inlet parameter. Furthermore, a substantially linear function L is defined in such a way that the end values of the inlet parameter and of the outlet parameter at the lower ends of the respective control ranges are connected together with the end values at the upper ends of the respective control ranges by this linear function L.

In accordance with the invention, the function $f$ linking the inlet parameter and the outlet parameter together is chosen in such a way that the gradient of this function in the case of the minimal inlet parameter is less than the gradient of the aforementioned linear function and greater than or equal to zero (first condition).

The gradient of the function $f$ within a first inlet-parameter range, which extends from the minimal inlet parameter up to a relatively greater, first predetermined value of the inlet parameter, is preferentially less than the gradient of the linear function.

Within an inlet-parameter range in which the gradient of the function $f$ is less than the gradient of the linear function L the control of the flow of cooling air through the ram-air duct is effected more intensely by a change, of the inlet parameter than by a change of the outlet parameter. In other words, the movable element at the outlet is, in comparison with the conventional control in accordance with the linear function, retracted comparatively further than the movable element at the inlet, and the control of the amount of cooling air takes place substantially by means of the movable element at the inlet. A further advantage is that, by reason of the smaller outlet parameter in relation to the conventional control, the cooling air flows out of the ram-air outlet duct at a higher speed, generating an additional thrust.

By way of second further condition, the value of the function $f$ for each inlet parameter within the control range thereof may be less than the value of the linear function. By way of third further condition, the gradient of the function in the case of the maximal inlet parameter may be greater than the gradient of the linear function. The gradient of the function within a second inlet-parameter range, which extends from a second predetermined inlet parameter up to the maximal inlet parameter, is preferentially greater than the gradient of the linear function.

In further advantageous configurations, either the aforementioned first condition and the aforementioned second condition, or the aforementioned second condition and the aforementioned third condition, or the aforementioned first condition, the aforementioned second condition and the aforementioned third condition, may be satisfied.

The movable element at the inlet may include a ram-air inlet-duct flap. The movable element at the outlet may include a ram-air outlet-duct flap.

The inlet parameter may be a flow cross-section of the inlet or a parameter characterising the position of the movable element at the inlet. The inlet parameter may, in particular, be an opening angle of an inlet-duct flap or a spacing of a region, in particular an end region, of a ram-air inlet-duct flap from a fixed region of an outer skin of the aircraft surrounding the inlet.

The outlet parameter may be a flow cross-section of the outlet or a parameter characterising the position of the movable element at the outlet. The outlet parameter may, in particular, be an opening angle of an outlet-duct flap or a spacing of a region, in particular an end region, of a ram-air outlet-duct flap from a fixed region of the outer skin of the aircraft surrounding the outlet.

In the ram-air duct the inlet parameter and/or the outlet parameter can be set continuously within their respective control ranges. Alternatively, a stepwise setting of the inlet parameter and/or of the outlet parameter within their respective control ranges is conceivable. In this connection, for the inlet parameter within the control range thereof a plurality of discrete inlet parameters may have been predetermined, and for the outlet parameter within the control range thereof likewise a plurality of discrete outlet parameters may have been predetermined. The respective discrete outlet parameters and the respective discrete inlet parameters can be linked together by the function $f$. The movable elements at the inlet and outlet are brought into such respective discrete positions that the throughput of cooling air remains minimal. An associated control temperature of the air-conditioning plant may lie within a range between a minimal and a maximal value. If an actual value of the control temperature exceeds the maximal value, the movable elements at the input and at the output are opened up by a respective step into a further discrete position, or opened. If the actual value of the control temperature falls below the minimal value, the movable elements are retracted by a respective step into a further discrete position, or closed. The magnitude and the location of the range of the control temperature of the air-conditioning plant are optimised in a manner depending on the particular given conditions of the plant or of the aircraft. This type of regulation with discrete inlet parameters and outlet parameters affords the further advantage that, by virtue of slighter wear and slighter attrition, the movable elements that are moved less frequently, for example ram-air-duct flaps, enhance the reliability of the air-conditioning plant and diminish the maintenance costs for users of the aircraft that are equipped with a ram-air duct of such a type.

The ram-air duct may further include a controller having a first control loop with an input and with an output for driving the movable element at the inlet, as well as a second control loop with an input and with an output for driving the movable element at the outlet. In this connection, at the output of the first control loop a control signal for setting a position of the movable element at the inlet may have been provided, and furthermore at the output of the second control loop a control signal for setting a position of the movable element at the outlet may have been provided. Lastly, a command variable that is common to both control loops is supplied to the input of the first control loop and to the input of the second control loop. This command variable is ascertained in a manner depending on a control temperature in the aircraft. This means that the positions of the movable elements at the inlet and at the outlet are dependent only on the command variable. This affords the further advantage that in the case of a fault, such as, for instance, the failure of an actuator, the movable elements can continue to control the throughput of cooling air without difficulty in terms of control engineering with the still functioning actuator. For the purpose of determining the command variable, in addition to the control temperature in the aircraft use may also be made of further parameters, such as, for example, a plant control temperature or a characteristic pressure in the ram-air duct.

Furthermore, a process is provided for controlling a mass flow of ambient air or cooling air through a ram-air duct. The ram-air duct includes a ram-air inlet duct and a ram-air outlet duct which is arranged downstream of the ram-air inlet duct and in fluid communication with the ram-air inlet duct. The ram-air duct further includes a movable element which is arranged at an inlet of the ram-air inlet duct and adapted to set an inlet parameter of the inlet, whereby a smaller inlet parameter corresponds to a smaller flow cross-section of the inlet and wherein a larger inlet parameter corresponds to a larger flow cross-section of the inlet. Furthermore, a movable element is present which is arranged at an outlet of the ram-air outlet duct and adapted to set an outlet parameter A of the outlet, wherein a smaller outlet parameter corresponds to a smaller flow cross-section of the outlet and wherein a larger outlet parameter corresponds to a larger flow cross-section of the outlet.

The process includes the following steps:
a) defining a control range for the inlet parameter from a minimal inlet parameter up to a maximal inlet parameter,
b) defining a control range for the outlet parameter from a minimal outlet parameter up to a maximal outlet parameter,
c) defining a substantially linear function L in such a manner that the end values of the inlet parameter and of the outlet parameter at the lower ends of the respective control ranges are connected together with the end points of the inlet parameter and of the outlet parameter at the upper ends of the respective control ranges by the linear function,
d) defining a function $f$ that links the outlet parameter and the inlet parameter together, so that an outlet parameter corresponding to a value $f(E)$ of the function $f$ is assigned to each inlet parameter.

In accordance with the invention, the function $f$ is defined in such a way that the gradient of the function $f$ in the case of the minimal inlet parameter is less than the gradient of the linear function L and greater than or equal to zero (first condition).

The function $f$ is preferentially determined in such a way that the gradient of the function $f$ within a first inlet-parameter range, which extends from the minimal inlet parameter up to a relatively greater, first predetermined value of the inlet parameter, is less than the gradient of the linear function L within this inlet-parameter range.

As a result, the same advantages are achieved as with the ram-air duct with the features according to the invention.

In step (d) the function $f$ can be defined in such a way that the value of the function $f$ for each inlet parameter within the control range of the inlet parameter is less than the value of the linear function L (second condition).

Furthermore, in step (d) the function $f$ can be defined in such a way that the gradient of the function $f$ in the case of the maximal outlet parameter is greater than the gradient of the linear function L (third condition).

In advantageous configurations of the invention, either the aforementioned first condition and the aforementioned second condition, or the aforementioned second condition and the aforementioned third condition, or the aforementioned first condition and the aforementioned third condition, or the aforementioned first condition, the second condition and the third condition may be satisfied.

In a further preferred embodiment, a first range for the inlet parameter can be defined in such a way that the latter is greater than or equal to the minimal inlet parameter and less than the maximal inlet parameter, wherein a value of the outlet parameter has been predetermined that is greater than the minimal outlet parameter and less than or equal to the maximal outlet parameter. Furthermore, the function $f$ can be chosen in such a way that for all values of the inlet parameter within the first range it is greater than or equal to the minimal outlet parameter and less than or equal to the predetermined value of the outlet parameter. This means that within the first range the outlet parameter is varied and controlled only between the minimal outlet parameter and the predetermined value of the outlet parameter. If the inlet parameter has the minimal inlet parameter, the outlet parameter can be controlled within a range that extends from the predetermined value of the outlet parameter to the maximal outlet parameter. This means that a mass flow of cooling air through the ram-air duct with maximally opened inlet is controlled by means of the movable element at the outlet.

In an alternative preferred embodiment, the function $f$ within the first range can be defined as a linear function or as a quadratic function.

In a still further preferred embodiment, the first range may be subdivided into a first subrange, which extends from the minimal inlet parameter up to a relatively greater, predetermined value of the inlet parameter, and a second subrange, which extends from the predetermined value of the inlet parameter up to the maximal inlet parameter. In this connection, the function $f$ within the first subrange may be defined as a constant function, wherein the outlet parameter is set, in particular, to its minimal value. Within the second subrange the function $f$ may be defined as a linear function. This means that within the first subrange the mass flow of cooling air is controlled only by means of the movable element at the inlet, and the movable element at the outlet is held at the minimal outlet parameter, bringing about a maximal additional thrust and a minimal additional aircraft drag.

In an alternative preferred embodiment, the first range may again be subdivided into a first subrange, which extends from the minimal inlet parameter up to a relatively greater, predetermined value of the inlet parameter, and into a second subrange, which extends from the predetermined value of the inlet parameter up to the maximal inlet parameter. In this connection, the inlet parameter within the first subrange and/or within the second subrange is controlled either in a manner depending on a pressure measured downstream of the ram-air inlet duct or in a manner depending on a pressure measured in the ram-air outlet duct.

If within the first and/or within the second subrange the inlet parameter is controlled in a manner depending on a pressure measured downstream of the ram-air inlet duct, the ram-air duct preferentially further includes a first pressure sensor which is arranged downstream of the ram-air inlet duct. In this connection, a control value of the pressure can be determined in a manner depending on one or more parameters which have been selected from the group that comprises the following: the outlet parameter, such as, for instance, position of the outlet-duct flap, the flying conditions, such as, for instance, altitude, airspeed, and the ambient conditions, such as, for instance, the ambient temperature.

If the inlet parameter within the first and/or second subrange is controlled in a manner depending on a pressure measured in the ram-air outlet duct, the ram-air duct preferentially further includes a pressure sensor which is arranged in the ram-air outlet duct. In this connection, a control value of the pressure can be determined in a manner depending on one or more parameters which have been selected from the group that comprises the following: the outlet parameter, such as, for instance, a position of the outlet-duct flap, the flying conditions, such as, for instance, altitude or airspeed, and the ambient conditions, such as, for instance, an ambient temperature.

BRIEF DESCRIPTION OF THE DRAWINGS

Preferred exemplary embodiments of a ram-air duct according to the invention and of the process according to the invention will be elucidated more fully in the following on the basis of the accompanying drawings. Shown therein are.

DETAILED DESCRIPTION

Figure 1:
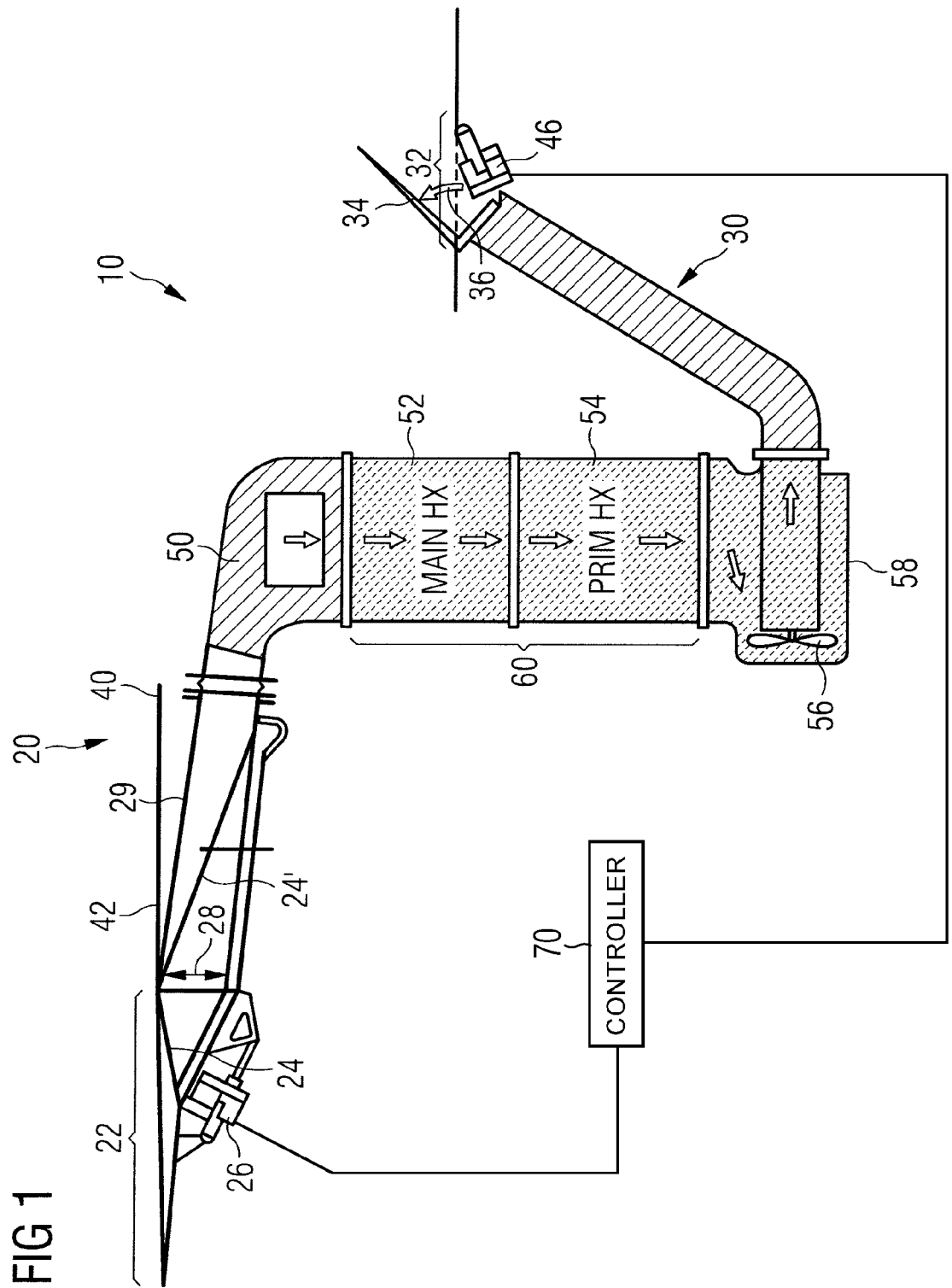
FIG. 1 is a schematic representation of a ram-air duct.

FIG. 1 shows in exemplary manner a ram-air duct 10 of an aircraft air-conditioning plant such as is employed in modern passenger aircraft. The ram-air duct 10 includes a ram-air inlet duct 20, an adapter piece, called ram-air-duct plenum 50, attached downstream of said ram-air inlet duct, a ram-air active portion 60 attached downstream of said ram-air-duct plenum, in which the heat-exchangers, in particular a main heat-exchanger 52 and a primary heat-exchanger 54, of the aircraft air-conditioning plant are arranged and which is perfused by the cold outside air by way of coolant, an adapter, called pack plenum 58, arranged downstream of the ram-air active portion 60, in which, in particular, a fan (ACM fan) 56 is arranged, as well as a ram-air outlet duct 30 arranged downstream of the adapter piece.

The ram-air inlet duct 20 exhibits at its upstream end a NACA inlet 22 recessed in the outer skin 42 of the aircraft. Furthermore, the ram-air inlet duct 20 includes a ram-air-duct flap which, in particular, is designed as a bipartite ram-air inlet-duct flap and includes a first movable element (first ram-air inlet-duct flap) 24, a second movable element (second ram-air inlet-duct flap) 24' and also an actuator 26 for setting the positions of the first and second ram-air inlet-duct flaps 24, 24'. A diffuser 29 is arranged downstream of the ram-air inlet-duct flaps 24, 24', in order to retard the flow of the ambient air supplied though the inlet 22 into the ram-air inlet duct 20. The actuator 26 is driven by a central control unit (not shown), i.e. it receives a control signal, whereupon the actuator simultaneously and synchronously sets the position of the ram-air inlet-duct flaps 24, 24'. In this connection, the ram-air inlet-duct flaps 24, 24' can be positioned within a control range between a first or minimal position, in which the ram-air inlet-duct flaps 24, 24' enable a minimal inlet parameter, and a second or maximal position, in which the inlet-duct flaps 24, 24' enable a maximal inlet parameter. The term 'inlet parameter' is used here as a collective term for any parameters that are suitable to serve as characteristic parameter for the flow cross-section of the inlet of the ram-air inlet duct 20. The inlet parameter may be the flow cross-section of the inlet 22 itself, or even an angular position of a ram-air inlet-duct flap 24, 24' or a spacing, in particular the spacing 28 shown in FIG. 1, between a region of the movable ram-air inlet-duct flaps 24, 24' and a fixed region of the ram-air inlet duct 20.

In the example shown in FIG. 1, the inlet parameter is the spacing 28 shown in FIG. 1 between a region of the outer skin 42 of the aircraft and an articulation between the first ram-air inlet-duct flap 24 and the second ram-air inlet-duct flap 24'. For the closed positions of the ram-air inlet-duct flaps 24, 24' shown in FIG. 1 by continuous lines, the spacing 28 and hence also the minimal inlet parameter is zero. In the position represented by broken lines in FIG. 1, the ram-air inlet-duct flaps 24, 24' and hence also the inlet 22 of the ram-air inlet duct 20 are, on the other hand, maximally open. The spacing 28, i.e. the inlet parameter, then assumes its maximal value. By means of the actuator 26 the first and second ram-air inlet-duct flaps 24, 24' can be controlled into an arbitrary position between positions corresponding to the minimal and maximal inlet parameters shown in FIG. 1.

In flight, the flow of outside air through the inlet 22 and through the inlet cross-section enabled by the ram-air inlet-duct flaps 24, 24' gets into the ram-air inlet duct 20. By reason of the retardation of the flow in the diffuser 29 of the ram-air inlet duct 20, some of the dynamic pressure of the flow is converted into static pressure. As a result, in the diffuser 29 and also at the input of the ram-air active portion 60 and at the input of the heat-exchangers 52, 54 a static overpressure, also designated as ram pressure, relative to the ambient pressure arises.

Figure 2:
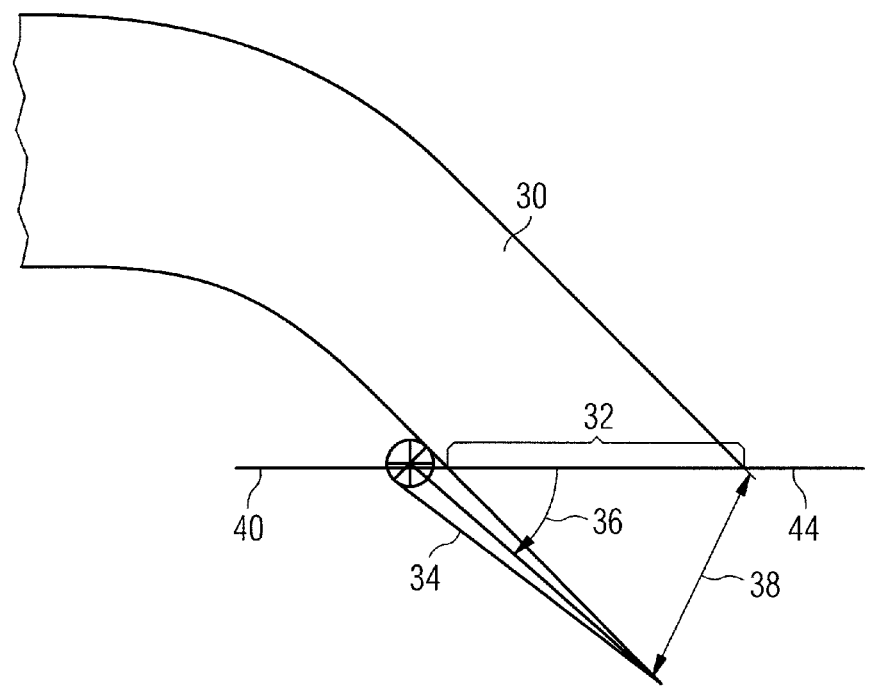
FIG. 2 is a schematic cross-sectional representation of a ram-air outlet duct with a ram-air outlet-duct flap.

The ram-air outlet duct 30 exhibits an its downstream end an outlet 32, the flow cross-section of which can be set by means of a movable element, conventionally designed, as a rule, as a ram-air outlet-duct flap 34, within a control range between a minimal outlet parameter and a maximal outlet parameter. An actuator 46 which is likewise driven by the central control unit (not shown) serves for setting the position of the ram-air outlet-duct flap 34. An enlarged and schematically further simplified representation of the ram-air outlet duct 30 is shown in FIG. 2.

Here the term 'outlet parameter' is used as a collective term for any parameters that may be representative of the size of the flow cross-section of the outlet 32. By way of outlet parameter, the flow cross-section of the outlet 32 itself, but also a position of the ram-air outlet-duct flap 34 determining the flow-cross-section of the outlet 32, for example, may be drawn upon. For example, the spacing 38 shown in FIG. 2 between an end region of the ram-air outlet-duct flap 34 and a fixed region 44 of the outer skin 40 of the aircraft or the opening angle 36, likewise shown in FIG. 2, of the ram-air outlet-duct flap 34 may be used by way of outlet parameter.

The ram-air outlet-duct flap 34 that has been opened up or opened generates, by reason of being flowed around by the outside air in the ram-air outlet duct, an overpressure relative to the ambient pressure, which has an effect at the output of the heat-exchangers 52, 54, in particular at the output of heat-exchanger 54. The differential pressure between the pressure at the input of heat-exchanger 52 and the pressure at the output of heat-exchanger 54 influences the mass flow of cooling air through the heat-exchangers 52, 54. The pressure ratios are influenced by the inlet parameter, in particular the position of the ram-air inlet-duct flaps 24, 24', and the outlet parameter, in particular the position of the ram-air outlet-duct flap 34, and in principle can consequently be set independently of one another by the actuator 26 for setting the ram-air inlet-duct flaps 24, 24' and by the actuator 46 for setting the ram-air outlet-duct flap 34.

Figure 3:
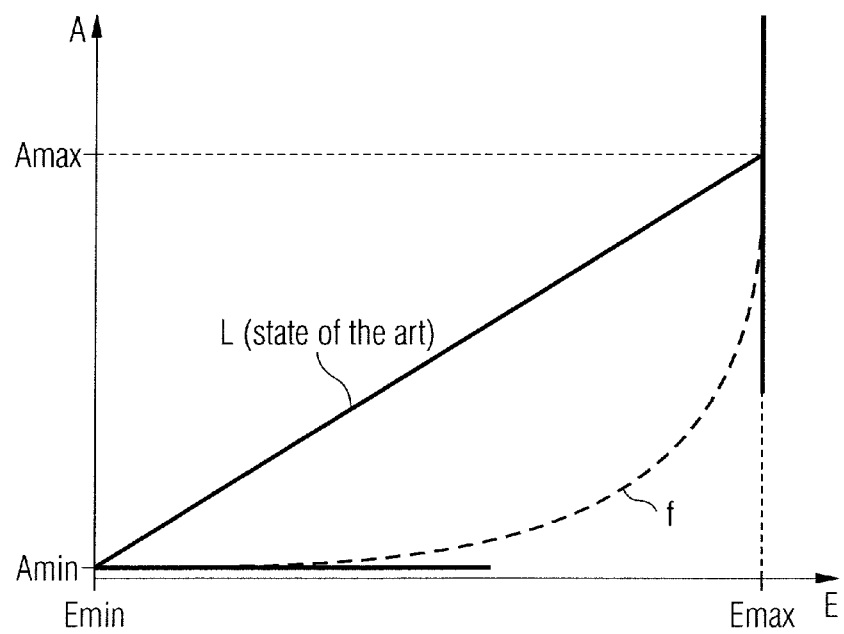
FIG. 3 is a diagram in which the linear relationship L between an inlet parameter E and an outlet parameter A according to the conventional control principle and the functional linkage f according to the invention are represented.

Conventionally, the inlet parameter, in particular the positions of the ram-air inlet-duct flaps 24, 24', and the outlet parameter, in particular the position of the ram-air outlet-duct flap 34, are set simultaneously and synchronously in a linear dependence relative to one another. FIG. 3 shows the linear relationship between the outlet parameter A and the inlet parameter E which is utilised in conventional control algorithms for the purpose of controlling the supply of ambient air to the air-conditioning plant of an aircraft. The inlet parameter E is adjustable within a control range from a first, minimal inlet parameter $E_{min}$ up to a second, maximal inlet parameter $E_{max}$. The inlet parameter E is characterised by the position of the ram-air inlet-duct flaps 24, 24' and, in the example of the ram-air inlet duct 20 shown in FIG. 1, is the spacing 28 of the articulation between the first and the second ram-air inlet-duct flaps 24, 24' and a fixed region of the outer skin 40 of the aircraft surrounding the inlet 22, in other words the spacing 28 of an end region of a respective ram-air inlet-duct flap 24, 24' and the fixed region surrounding the inlet 22.

The outlet parameter A is characterised by the position of the ram-air outlet-duct flap 34 and, in the example shown in FIGS. 1 and 2, is the opening angle or vent angle 36 of the ram-air outlet-duct flap 34 in relation to the fixed outer skin 40 of the aircraft. The outlet parameter A is adjustable within a control range from a first, minimal outlet parameter $A_{min}$ up to a second, maximal outlet parameter $A_{max}$.

Conventionally, linear actuators are employed at the ram-air-duct input and output, and the linear relationship L shown in FIG. 3 between the outlet parameter A or the position of the ram-air outlet-duct flap 34 and the inlet parameter E or the position of the ram-air inlet-duct flaps 24, 24' corresponds to a linear relationship within the range of action of the linear motors of the actuators 26, 46. The structure of the ram-air outlet duct 20 and the principle of the linear dependence between the position of the ram-air inlet-duct flaps 24, 24' and the position of the ram-air outlet-duct flap 34 has the consequence that in normal flying operation the ram-air outlet-duct flap 34 has to be opened relatively wide, i.e. with an opening angle of more than about 10° relative to the outer skin 40 of the aircraft, in order to satisfy the requirements as regards the amount of cooling air to be supplied. This relatively large opening causes a high additional aircraft drag.

Therefore the conventional, linear dependence between the inlet parameter or the position of the ram-air inlet-duct flaps 24, 24' and the outlet parameter or the position of the ram-air outlet-duct flap 34 in the control of the ram-air-duct flaps is modified in such a way that the ram-air outlet-duct flap 34 is opened as little as possible, i.e. minimally, starting from the minimal inlet parameter $A_{min}$, over a control range that is as long as possible and that, at the same time, over a control range that is as long as possible the ram-air inlet-duct flaps 24, 24' undertake the control of the amount of ambient cooling air over a control range that is as long as possible, starting from the inlet parameter $E_{min}$ or the minimal inlet-duct-flap position.

In comparison with the conventional ram-air-duct flap control with the linear relationship according to curve L in FIG. 3, for the purpose of defining the relationship between the outlet parameter A (position of the ram-air outlet-duct flap 34) and the inlet parameter E (position of the ram-air inlet-duct flaps 24, 24') any functional relationship or any function ƒ is suitable that in the diagram of FIG. 3 connects together the end values at the lower end of the respective control ranges, i.e. for minimal inlet parameters and outlet parameters $E_{min}$, $A_{min}$, in other words flaps 24, 24', 34 that have been opened up minimally, and the end values at the upper end of the respective control ranges, i.e. for maximal inlet parameters and outlet parameters $E_{max}$, $A_{max}$, in other words for maximally opened inlet-duct and outlet-duct flaps 24, 24', 34, and that extends below the linear dependence (or the straight line) L. In other words, and as is immediately evident in FIG. 3, the control of the ram-air-duct flaps satisfies the following conditions:

i) the gradient of the function ƒ, which specifies the relationship between the outlet parameter and the inlet parameter in accordance with the equation A=ƒ(E), in the case of the minimal inlet parameter $E_{min}$ and preferentially also within a first inlet-parameter range adjoining the minimal inlet parameter $E_{min}$ (in FIG. 3 to the right of the minimal inlet parameter $E_{min}$) is less than the gradient of the linear function L that connects together the end values ($E_{min}$, $A_{min}$) and ($E_{max}$, $A_{max}$) and that describes the conventional linear relationship between the outlet parameter and the inlet parameter.

ii) The values of the function $f$ within the entire control range, i.e. within the entire range of the inlet parameter between the minimal inlet parameter $E_{min}$ and the maximal inlet parameter $E_{max}$, are less than the value of the linear function L. In other words, the outlet parameter or position of the outlet-duct flap 34 pertaining to a respective inlet parameter or position of the inlet-duct flaps 24, 24' within the entire control range according to the invention is less than the outlet parameter that was set in accordance with the conventional control algorithm, i.e. the linear relationship L.

iii) The gradient of the function $f$ in the case of the maximal inlet parameter $E_{max}$ and preferentially also within a second inlet-parameter range extending from the maximal inlet parameter $E_{max}$ towards smaller inlet parameters is greater than the gradient of the function L that connects together the end values ($E_{min}$, $A_{min}$) and ($E_{max}$, $A_{max}$) and that describes the conventional linear relationship between the outlet parameter and the inlet parameter.

Figure 4:
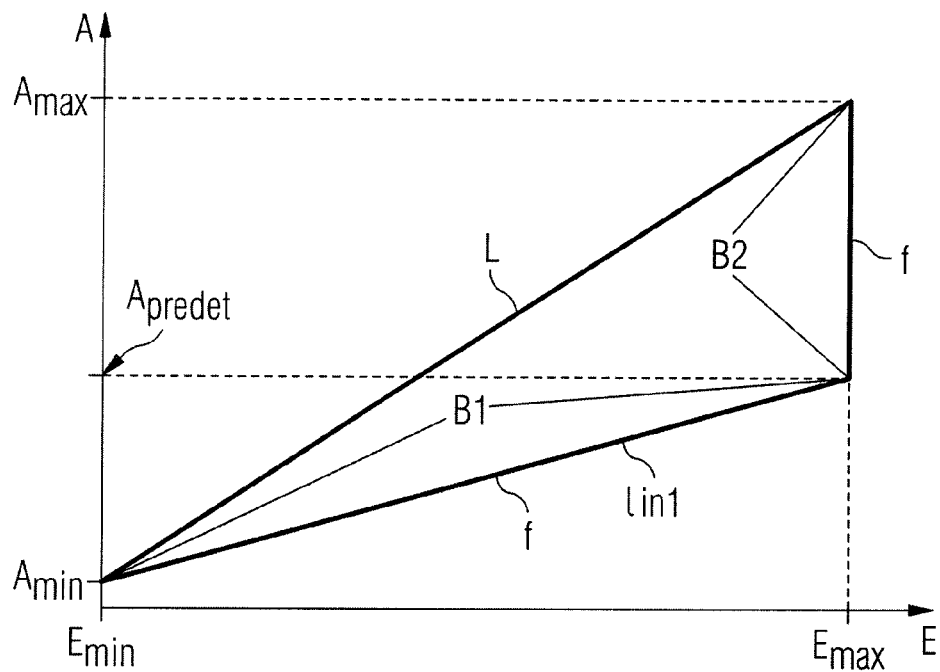
FIG. 4 is a diagram in which a relationship between the outlet parameter A and the inlet parameter E according to a first embodiment of the invention is represented.
Figure 5:
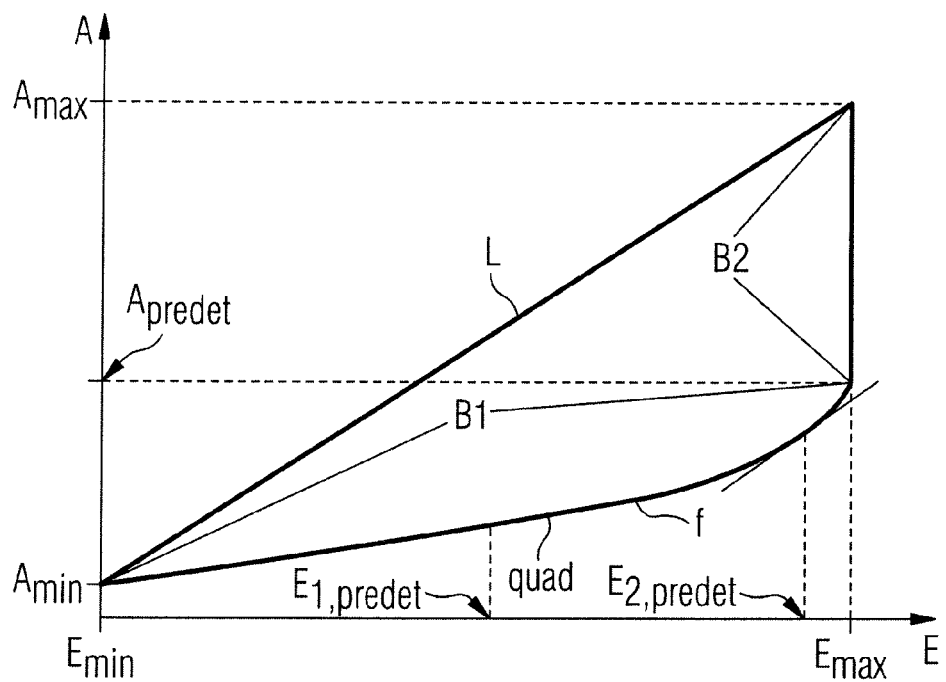
FIG. 5 is a diagram in which a relationship between the outlet parameter A and the inlet parameter E according to a second embodiment of the invention is represented.
Figure 6:
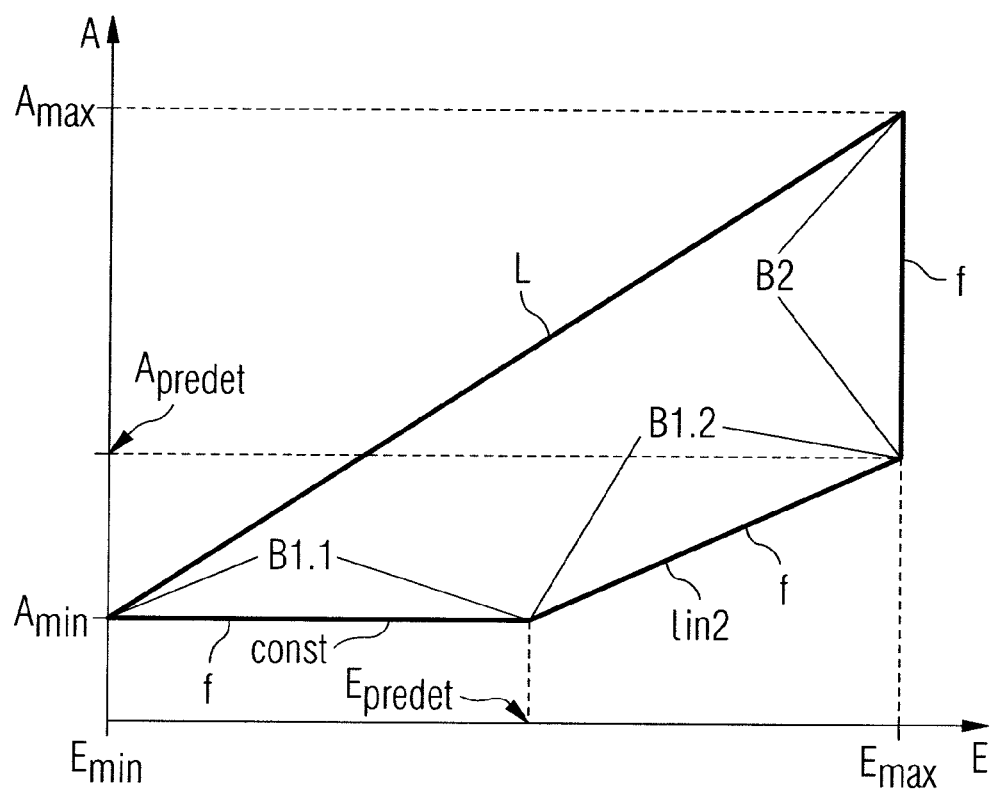
FIG. 6 is a diagram in which a relationship between the outlet parameter A and the inlet parameter E according to a third embodiment of the invention is represented.

In FIGS. 4 to 6 preferred embodiments of the function $f$ describing the functional relationship between the outlet parameter A and the inlet parameter E are illustrated graphically. In the embodiments in FIGS. 4 to 6 in each instance two ranges B1 and B2 are distinguished in a manner depending on the positions of the outlet-duct and inlet-duct flaps. Within range B1, in the case of rising demand for amount of cooling air the ram-air inlet-duct flaps 24, 24' are controlled from their minimal position $E_{min}$, i.e. the position to which a minimal inlet cross-section corresponds, as far as the maximal position, i.e. the position to which a maximally possible inlet cross-section corresponds. Synchronously therewith, the ram-air outlet-duct flap 34 is opened from its minimal position $A_{min}$, i.e. the position to which a minimal outlet cross-section corresponds, only as far as a predetermined position $A_{predet}$, at which the outlet-duct flap 34 is only partly open. Within range B2 the position of the ram-air inlet-duct flaps 24, 24' is constant, to be specific at the position that corresponds to the maximal inlet parameter $E_{max}$. In the case of rising demand for cooling air, the ram-air outlet-duct flap 34 is opened from the predetermined outlet parameter $A_{predet}$ as far as its maximal outlet parameter $A_{max}$, which corresponds to the maximally settable outlet cross-section.

An advantage of the control principle described previously herein consists in the fact that in normal operation of a flying aircraft the control of the amount of cooling air takes place within range B1. This means that in normal operation of the aircraft the ram-air outlet-duct flap 34 is located in a position with a smaller opening angle relative to the surface of the aircraft than in the case of a conventional flap control. This contributes distinctly towards a reduction of the additional aircraft drag. In addition, a thrust is also generated that at least partly compensates the additional drag generated by the ram-air duct 10. The ram-air-duct flaps 24, 24', 34 are brought into the control range B2 only if an extremely high throughput of cooling air is required, i.e. if the air-conditioning plant has to achieve a particularly great cooling power and/or warmer ambient temperatures prevail. The positions of the ram-air-duct flaps 24, 24', 34 for the transitions between ranges B1 and B2, i.e. in particular the maximal inlet parameter $E_{max}$, the predetermined outlet parameter $A_{predet}$ and the maximal outlet parameter $A_{max}$, are determined and defined separately for each aircraft and each system.

In particular, within range B1 the position of the ram-air outlet-duct flap 34 is set as master default from the minimal position $A_{min}$ up to the predetermined position $A_{predet}$, and the ram-air inlet-duct flaps 24, 24' are opened by way of slave control from the minimal up to the maximal inlet parameter by means of the conformity with a physical law preset by the function $f$, so that the pressure in the ram-air outlet duct 30 is kept as high as possible, the outlet-duct flap 34 is closed as far as possible, and the speed of the out flowing air is maximised. In connection with the definition of the conformity with a physical law (the function $f$), care is taken to ensure that the ram-air inlet-duct flaps 24, 24' are not opened further without demand (demand for cooling air) or benefit (cooling power), so that the additional aircraft drag is not increased unnecessarily thereby. The conformity with a physical law is determined, optimised and defined separately for each aircraft and each system. At least the following three possibilities for defining such a suitable conformity with a physical law are conceivable:

1. According to a defined conformity with a physical law, for each position of the ram-air outlet-duct flap 34 a position of the ram-air inlet-duct flaps 24, 24' is defined, i.e., a function $f$ is defined that links together the position of the inlet-duct flaps and the position of the outlet-duct flap.

2. For a position of the ram-air outlet-duct flaps that has been preset in the given case by way of master control variable, the position of the ram-air inlet-duct flaps 24, 24' is controlled in a manner depending on the pressure behind the ram-air inlet duct 20. To this end, a pressure sensor is arranged behind, i.e. downstream of, the ram-air inlet duct 20. The control value for the pressure is determined in a manner depending on the position of the ram-air outlet-duct flap 34 and can additionally be determined from the flying conditions and ambient conditions, such as, for instance, altitude, airspeed and ambient temperature.

3. For a respective position of the ram-air outlet-duct flap 34 as master default, the position of the ram-air inlet-duct flaps 24, 24' is controlled in a manner depending on the pressure in the ram-air outlet duct 30. To this end, a pressure sensor is positioned in the ram-air outlet duct 30. The control-pressure value for the pressure is determined in a manner depending on the position of the ram-air outlet-duct flap 34 and may additionally be determined from the flying conditions and ambient conditions, such as, for instance, altitude, airspeed and ambient temperature.

By way of fixed conformity with a physical law, in particular the following possibilities for defining the function $f$ within range B1 are conceivable and are particularly easy to implement in terms of control engineering:

A) Within the entire range B1, i.e. within the control range of the outlet parameter between the minimal outlet parameter $A_{min}$ and the predetermined outlet parameter $A_{predet}$, and also within the control range of the inlet parameter from $E_{min}$ to $E_{max}$, a linear conformity with a physical law lin1, as shown in FIG. 4, is utilised.

B) Within the entire range B1, i.e. within the control range of the outlet parameter between $A_{min}$ and $A_{predet}$ and within the control range of the inlet parameter between $E_{min}$ and $E_{max}$, a quadratic conformity with a physical law quad, as shown in FIG. 5, is utilised. According to this, the increase in the outlet parameter is a quadratic function of the increase in the inlet parameter.

C) Within range B1 an intermittent linear conformity with a physical law is implemented, as shown in FIG. 6. To this end, range B1 is subdivided into a first subrange B1.1 and into a second subrange B1.2 which in the case of a predetermined inlet parameter $E_{predet}$ adjoins range B1.1. Within range B1.1 the position of the ram-air outlet-duct flap 34 is constant and corresponds, in particular, to the minimal outlet cross-section or to the outlet parameter $A_{min}$. In this connection, the angle of inclination of the ram-air outlet-duct flap 34 should lie distinctly below 10° relative to the outer skin 40 of the aircraft. Within range B1.1 the mass flow of cooling air is controlled only with the ram-air inlet-duct flaps 24, 24' and only as far as the predetermined inlet parameter $E_{predet}$. Within range B1.2 a linear relationship lin2 (see FIG. 6) exists between the outlet parameter and the inlet parameter, i.e. both the ram-air inlet-duct flaps 24, 24' and the ram-air outlet-duct flap 34 control the mass flow of cooling air by changing their positions. In the case of increasing demand for cooling air, the ram-air inlet-duct flaps 24, 24' are opened up as far as the maximally open position corresponding to the maximal inlet parameter $E_{max}$, and, synchronously with this, the ram-air outlet-duct flap 34 is opened from its position corresponding to the minimal outlet parameter $A_{min}$ as far as a position corresponding to a predetermined outlet parameter $A_{predet}$. Within range B2 the position of the ram-air inlet-duct flaps 24, 24' is constant at the position corresponding to the maximal inlet parameter $E_{max}$, and in the case of rising demand for cooling air the ram-air outlet-duct flap 34 is opened from the position corresponding to the predetermined outlet parameter as far as the position corresponding to the maximal outlet parameter $A_{max}$.

D) In a modification of the quadratic conformity with a physical law described above under B), any other functional conformity with a physical law is conceivable that can be implemented in terms of control engineering and that presets a function $f$ with gradient increasing towards high inlet parameters, such as, for instance, a cubic or an exponential conformity with a physical law.

It can be particularly advantageous to control the positions of the ram-air-duct flaps 24, 24', 34 in accordance with the conformities with a physical law described above not continuously but intermittently or in stepwise manner. In this connection, the inlet-duct flaps 24, 24' and the outlet-duct flap 34 are set only to respective discrete positions. A discrete position $E_i$ of the inlet-duct flaps 24, 24' is assigned to a respective discrete position $A_i$ of the ram-air outlet-duct flap 34 via the conformity with a physical law (for example, the function $f$). The ram-air-duct flaps 24, 24', 34 are brought into such a position that the throughput of cooling air remains minimal. In this connection, the control temperature of an air-conditioning plant may be located within a range between a minimal and a maximal value. If the actual value of the control temperature exceeds the maximal value, the ram-air-duct flaps 24, 24', 34 are opened up further by one step to the respective next discrete position. If the actual value of the control temperature fails below the minimal value, the ram-air-duct flaps 24, 24', 34 are retracted by a respective step to the next-smaller discrete position.

An advantage of this stepwise control consists in the fact that the ram-air-duct flaps 24, 24', 34 are moved or operated less frequently, which may entail a slighter wear and a slighter attrition and may also enhance the reliability of the air-conditioning plant and reduce the maintenance costs for customers. The magnitude and the location of the range or the ranges of the control temperature of the plant are determined and optimised in a manner depending on the properties of the air-conditioning plant.

In the embodiments described above with reference to FIGS. 3 to 6 it was assumed that the inlet parameter is set in direct dependence on the outlet parameter while conforming to the functional linkage by the function $f$ with $A=f(E)$. In an advantageous further development, the movable elements at the inlet and at the outlet, in particular the ram-air inlet-duct flaps and the ram-air outlet-duct flap, control the throughput of cooling air by means of a common command variable, the common command variable being ascertained in a manner depending on the control temperature of the air-conditioning plant. In this connection, the dependence of the inlet parameter on the common command variable and the dependence of the outlet parameter on the common command variable are chosen in such a way that a relationship exists between the inlet parameter and the outlet parameter, as is illustrated in FIG. 3 by the curve $f$, i.e. that the relationship between the inlet parameter and the outlet parameter satisfies the conditions elucidated above. In this embodiment, a controller 70 is operatively connected to the movable elements (see FIG. 1), the controller including mutually independent control loops for the movable element at the inlet and the movable element at the outlet, i.e. for the ram-air inlet-duct flaps and for the ram-air outlet-duct flap, that are developed in a manner depending on the given conditions of the air-conditioning plant to be regulated and depending on the constructional features of the ram-air duct. Consequently the positions of the movable elements, i.e. of the ram-air inlet-duct flaps and of the ram-air outlet-duct flap, are dependent only on the command variable. This embodiment affords a further advantage, namely that in the event of a failure of one of the actuators at the inlet and at the outlet the other, still functioning actuator is able to drive the corresponding movable element and hence continue to control the throughput of cooling air without difficulty in terms of control engineering. The principle of the drive by the common command variable is also applicable to ram-air ducts with only one actuator. For the purpose of determining the command variable, in addition to the control temperature of the air-conditioning plant use may also be made of further parameters, such as, for instance, the plant control temperature or a characteristic pressure in the ram-air duct.

The ram-air-flap control described above contributes towards diminishing the overall drag and, as a result, the fuel consumption of an aircraft and, as a result, contributes towards increasing the range of the aircraft.

The invention claimed is:

1. A ram-air duct for supplying ambient air in an aircraft, comprising:
  a ram-air inlet duct including an inlet,
  a ram-air outlet duct including an outlet and arranged downstream of the ram-air inlet duct and in fluid communication with the ram-air inlet duct,
  a first movable element located at the inlet of the ram-air inlet duct and adapted to set an inlet parameter of the inlet, wherein a smaller inlet parameter corresponds to a smaller flow cross-section of the inlet and a larger inlet parameter corresponds to a larger flow cross-section of the inlet, and wherein the inlet parameter is adjustable within a control range from a minimal inlet parameter up to a maximal inlet parameter,
  a second movable element located at the outlet of the ram-air outlet duct and adapted to set an outlet parameter of the outlet, wherein a smaller outlet parameter corresponds to a smaller flow cross-section of the outlet and a larger outlet parameter corresponds to a larger flow cross-section of the outlet, and wherein the outlet parameter is adjustable within a control range from a minimal outlet parameter up to a second, maximal outlet parameter, and a control unit operatively coupled to actuators for moving the first and second movable elements, the control unit programmed to implement a control function linking together the outlet parameter and the inlet parameter, the control function designed such that an outlet parameter corresponding to a value of the control function is assigned to each inlet parameter, the control unit actuating the actuators to move the first and second movable elements according to the control function when the control unit implements the control function, wherein a substantially linear function is defined in such a way that connects together with a constant, linear gradient the end values of the inlet parameter and of the outlet parameter at the minimal ends of the respective control ranges and the end values of the inlet parameter and of the outlet parameter at the maximal ends of the respective control ranges, thereby providing an outlet parameter corresponding to a value of the linear function for each inlet parameter, and wherein the control function implemented by the control unit defines a gradient at the minimal inlet parameter that is less than the constant, linear gradient of the linear function and that is greater than or equal to zero.

2. The ram-air duct according to claim 1, wherein the value of the control function implemented by the control unit for each inlet parameter between the minimal inlet parameter and the maximal inlet parameter is less than the value of the linear function for the same inlet parameter.

3. The ram-air duct according to claim 2, wherein the control function implemented by the control unit defines a gradient at the maximal inlet parameter that is greater than the constant, linear gradient of the linear function.

4. The ram-air duct according to claim 1, wherein the control function implemented by the control unit defines a gradient at the maximal inlet parameter that is greater than the constant, linear gradient of the linear function.

5. The ram-air duct according to claim 1, wherein the first movable element at the inlet includes at least one ram-air inlet-duct flap, and the second movable element at the outlet includes at least one ram air outlet-duct flap.

6. The ram-air duct according to claim 1, wherein the inlet parameter is selected from the flow cross-section of the inlet and a chosen parameter characterizing the position of the first movable element at the inlet; and wherein the outlet parameter is selected from a flow cross-section of the outlet and a chosen parameter characterizing the position of the movable element at the outlet.

7. The ram-air duct according to claim 1, wherein the control unit further includes a first control loop with an input and with an output for driving the first movable element at the inlet, and a second control loop with an input and with an output for driving the second movable element at the outlet, wherein at the output of the first control loop a control signal for setting a position of the first movable element at the inlet is provided, wherein at the output of the second control loop a control signal for setting a position of the second movable element at the outlet is provided, and wherein a command variable is supplied to the input of the first control loop and to the input of the second control loop, the command variable being ascertained in dependence on a control temperature in the aircraft.

8. A method for controlling a mass flow of ambient air or cooling air through a ram-air duct of an aircraft, the ram-air duct including:

a ram-air inlet duct including an inlet, a ram-air outlet duct including an outlet and arranged downstream of the ram-air inlet duct and in fluid communication with the ram-air inlet duct, a first movable element located at the inlet of the ram-air inlet duct and adapted to set an inlet parameter of the inlet, wherein a smaller inlet parameter corresponds to a smaller flow cross-section of the inlet and a larger inlet parameter corresponds to a larger flow cross-section of the inlet, and a second movable element located at the outlet of the ram-air outlet duct and adapted to set an outlet parameter of the outlet, wherein a smaller outlet parameter corresponds to a smaller flow cross-section of the outlet and a larger outlet parameter corresponds to a larger flow cross-section of the outlet, and a control unit operatively coupled to actuators for moving the first and second movable elements, wherein the method comprises the following steps:
  a) defining a control range for the inlet parameter set by the first movable element so as to extend from a minimal inlet parameter up to a maximal inlet parameter,
  b) defining a control range for the outlet parameter set by the second movable element so as to extend from a minimal outlet parameter up to a maximal outlet parameter,
  c) defining a substantially linear function in such a manner that connects together with a constant, linear gradient the end values of the inlet parameter and of the outlet parameter at the minimal ends of the respective control ranges and the end values of the inlet parameter and of the outlet parameter at the maximal ends of the respective control ranges, thereby providing an outlet parameter corresponding to a value of the linear function for each inlet parameter,
  d) defining a control function that links together the outlet parameter and the inlet parameter so that an outlet parameter corresponding to a value of the control function is assigned to each inlet parameter, wherein the control function defines a gradient at the minimal inlet parameter that is less than the constant, linear gradient of the linear function and that is greater than or equal to zero, and
  e) implementing the control function with the control unit by actuating movements of the first and second movable elements according to the control function.

9. The method according to claim 8, wherein in step (d) the value of the control function implemented by the control unit in step (e) for each inlet parameter within the control range is less than the value of the linear function for the same inlet parameter.

10. The method according to claim 9, wherein in step (d) the control function implemented by the control unit in step (e) defines a gradient at the maximal outlet parameter that is greater than the constant, linear gradient of the linear function.

11. The method according to claim 8, wherein in step (d) the control function implemented by the control unit in step (e) defines a gradient at the maximal outlet parameter that is greater than the constant, linear gradient of the linear function.

12. The method according to claim 8, further comprising:
defining a first range for the inlet parameter in such a way that each inlet parameter within the first range is greater than or equal to the minimal inlet parameter and less than the maximal inlet parameter, and setting a predetermined value of the outlet parameter that is greater than the minimal outlet parameter and less than or equal to the maximal outlet parameter, wherein the control function is designed such that the values of the control function for all inlet parameters within the first range are greater than or equal to the minimal outlet parameter and less than or equal to the predetermined value of the outlet parameter.

13. The method according to claim 12, wherein the control function is designed such that when the inlet parameter corresponds to the maximal inlet parameter, the outlet parameter is set by the control function to be within a range that extends from the predetermined value of the outlet parameter up to the maximal outlet parameter.

14. The method according to claim 13, wherein the first range is subdivided into a first subrange, which extends from the minimal inlet parameter up to a relatively greater, predetermined value of the inlet parameter, and a second subrange, which extends from the predetermined value of the inlet parameter up to the maximal inlet parameter, and wherein the control function defines a constant function within the first subrange, and the control function defines a linear function within the second subrange.

15. The method according to claim 13, wherein the first range is subdivided into a first subrange, which extends from the minimal inlet parameter up to a relatively greater, predetermined value of the inlet parameter, and into a second subrange, which extends from the predetermined value of the inlet parameter up to the maximal inlet parameter, and wherein the inlet parameter within at least one of the first subrange and the second subrange is controlled in a manner either depending on a pressure measured downstream in relation to the ram-air inlet duct or depending on a pressure measured in the ram-air outlet duct.

16. The ram-air duct according to claim 6, wherein the first movable element includes an inlet-duct flap, and the chosen parameter characterizing the position of the first movable element at the inlet is either an opening angle of the inlet-duct flap or a spacing of a region of the inlet-duct flap from a fixed region of an outer skin of the aircraft surrounding the inlet.

17. The ram-air duct according to claim 6, wherein the second movable element includes an outlet-duct flap, and the chosen parameter characterizing the position of the second movable element at the outlet is either an opening angle of the outlet-duct flap or a spacing of a region of the outlet-duct flap from a fixed region of the outer skin of the aircraft surrounding the outlet.

18. The ram-air duct according to claim 17, wherein the region of the outlet-duct flap is an end region of the outlet-duct flap.

* * * * *